Figure 8:
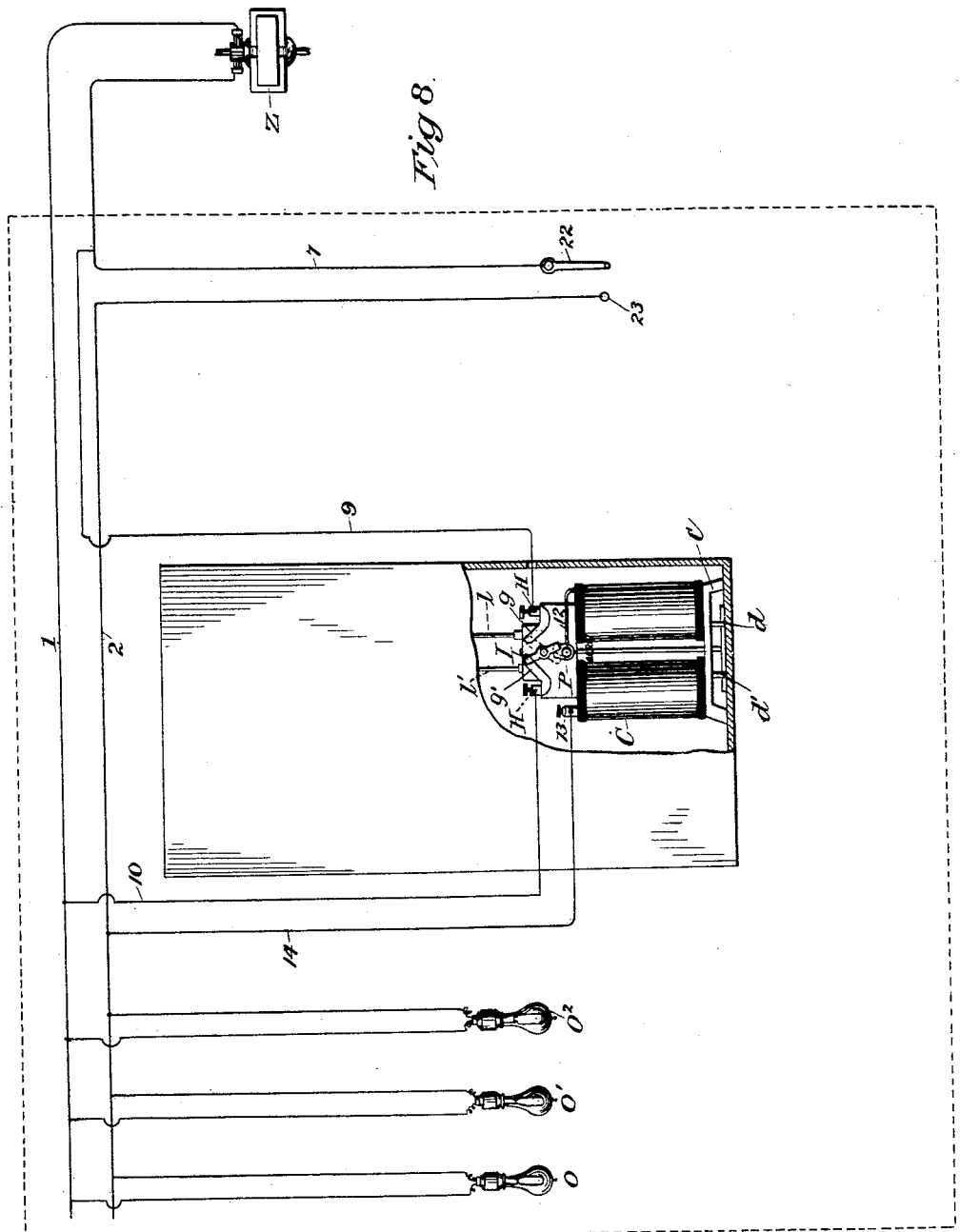

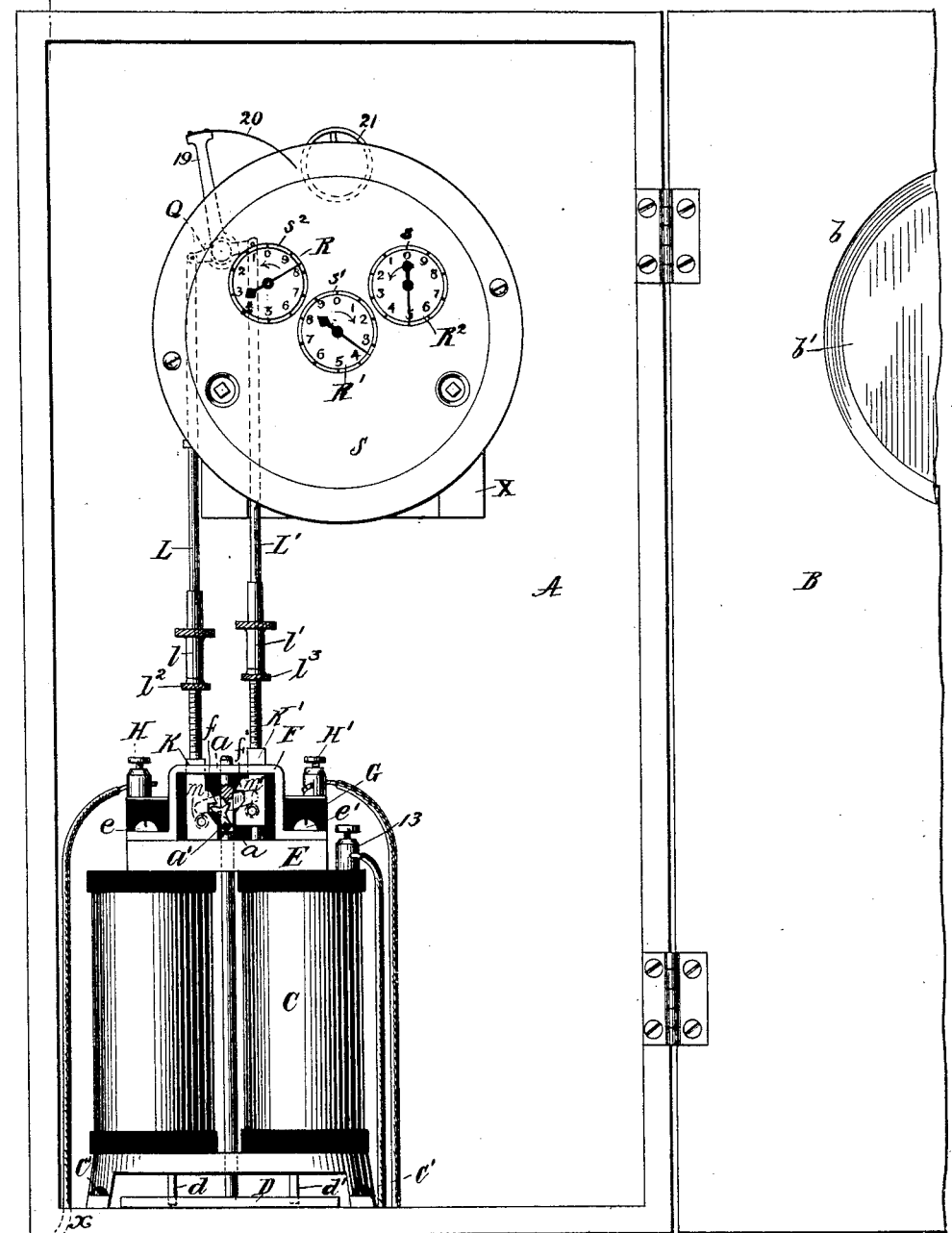

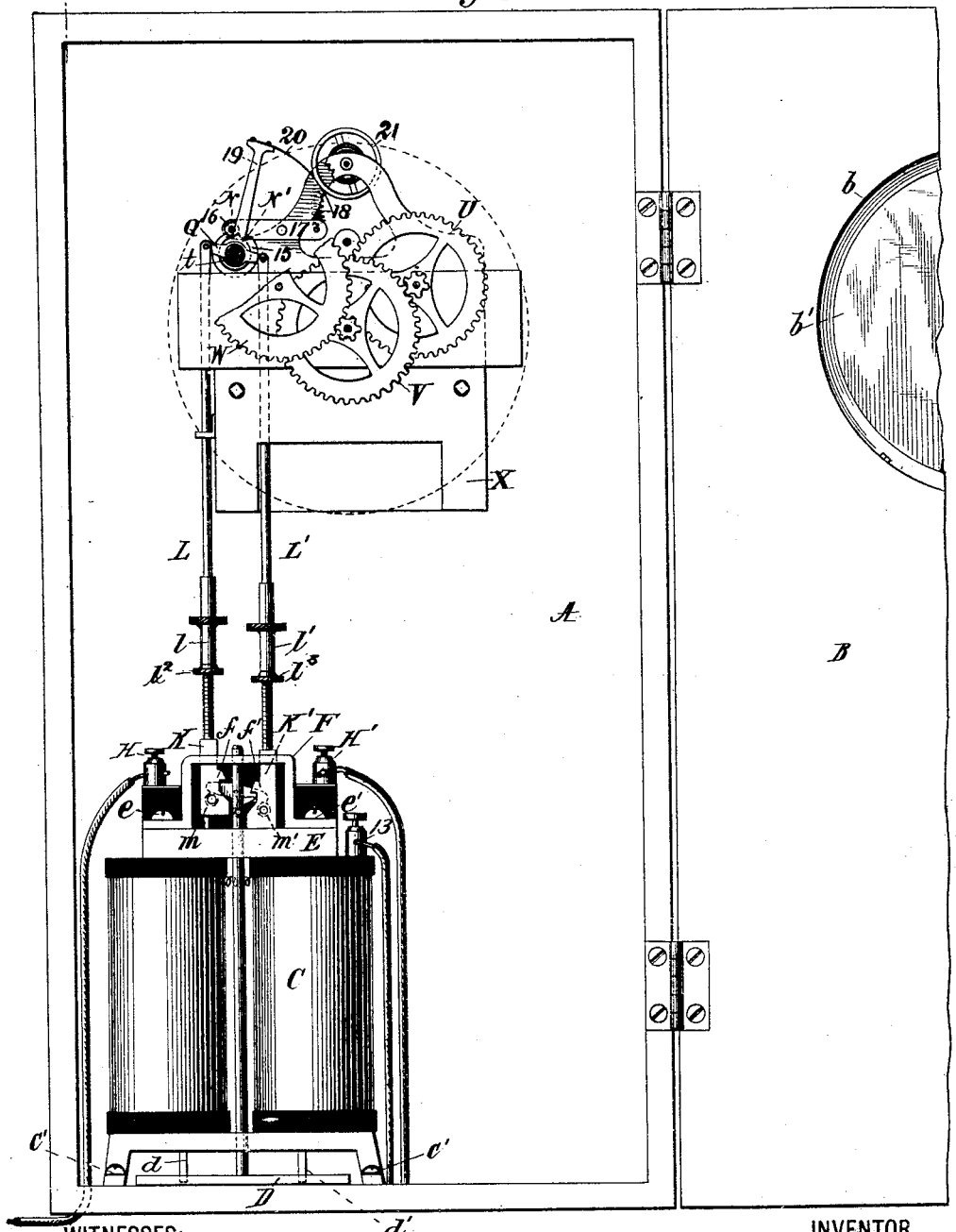

(No Model.) 5 Sheets—Sheet 3.
H. H. PATTEE.
TIME REGISTERING APPARATUS FOR ELECTRICITY.
No. 478,237. Patented July 5, 1892.
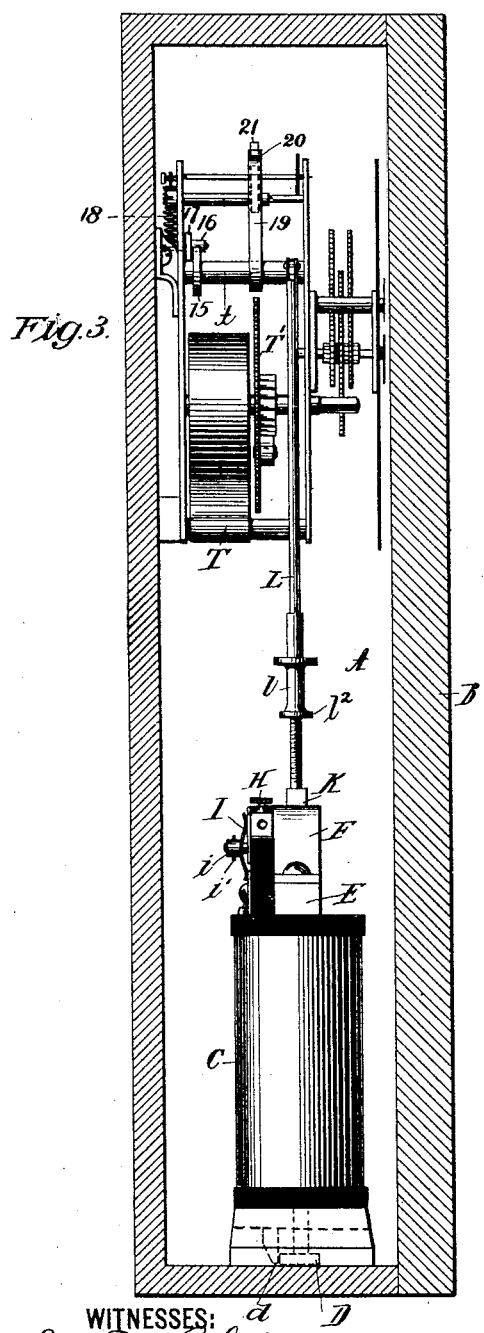
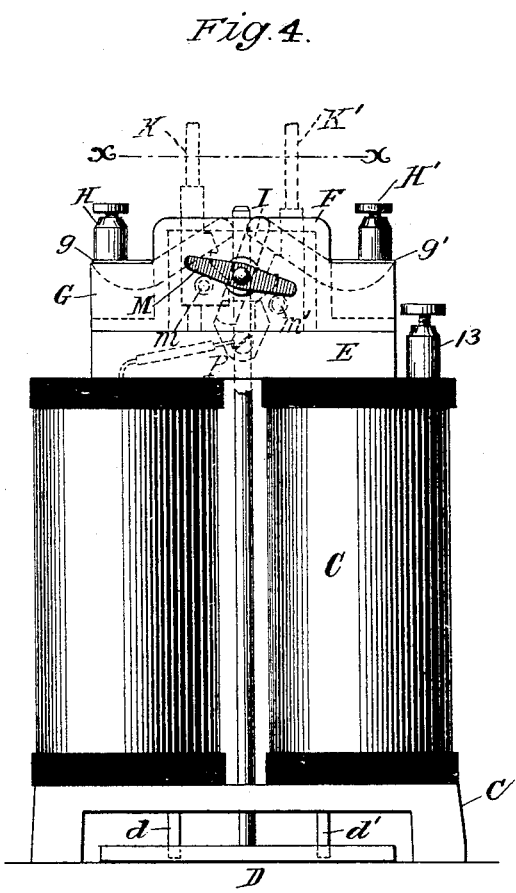
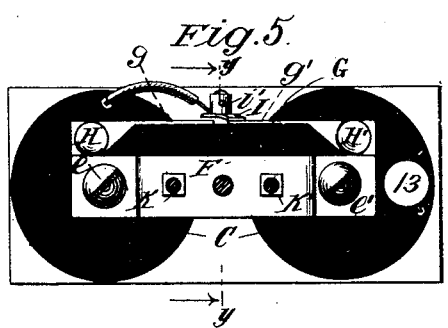
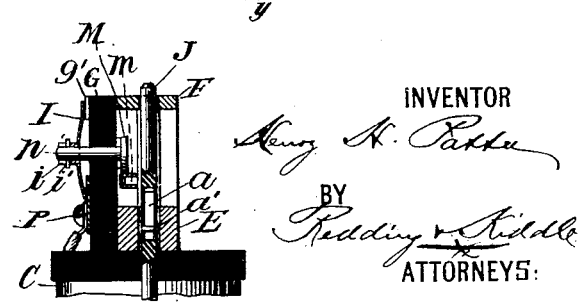
WITNESSES:
Edward C. Rowland
M. Suter
INVENTOR
Henry H. Pattee
BY
Redding & Riddle
ATTORNEYS

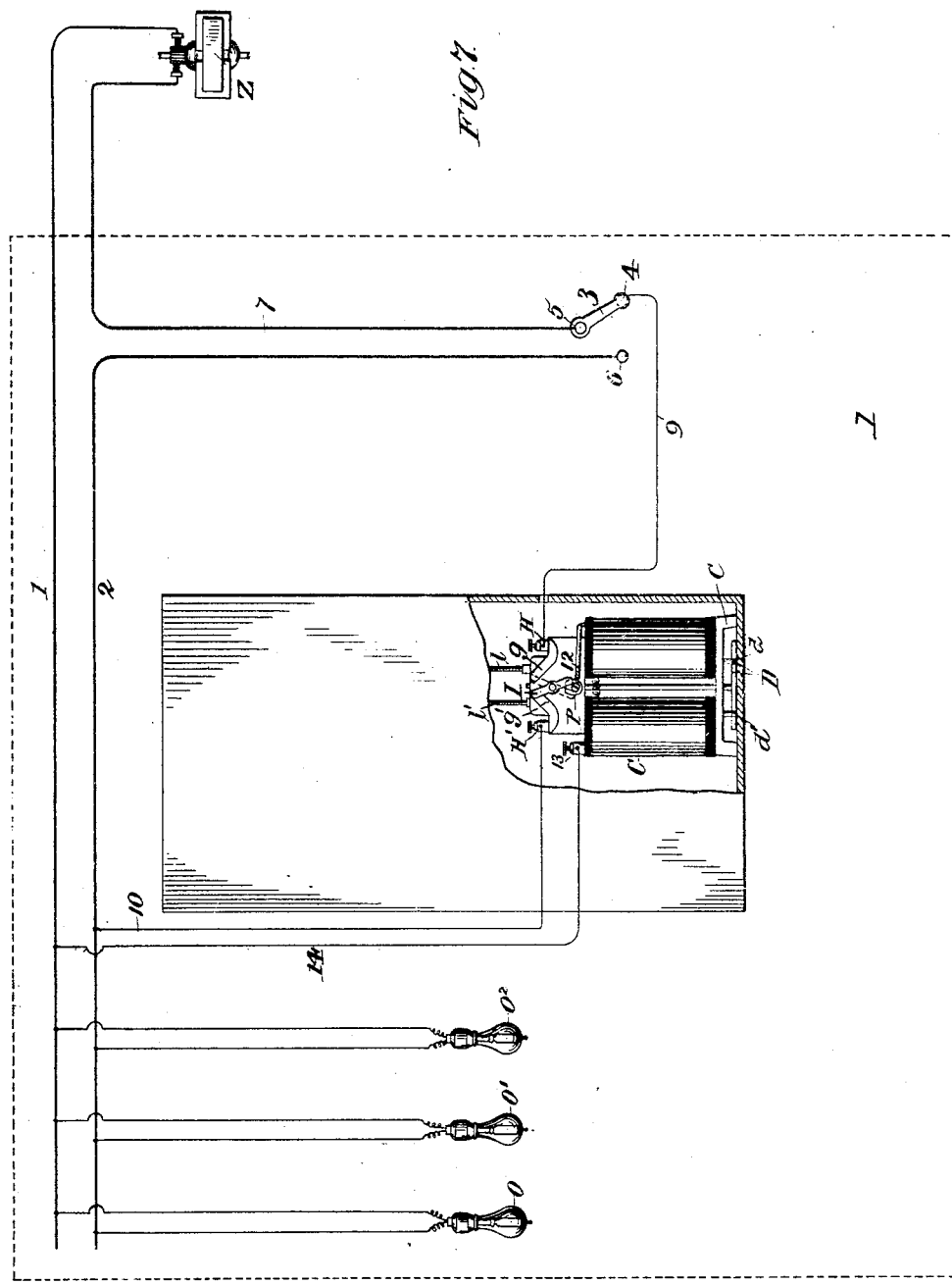

(No Model.) 5 Sheets—Sheet 5.

H. H. PATTEE.
TIME REGISTERING APPARATUS FOR ELECTRICITY.

No. 478,237. Patented July 5, 1892.

WITNESSES:
Edward C. Rowland.
Henry Parsons.

INVENTOR
Henry H. Pattee,
BY
Redding & Riddle
ATTORNEYS

UNITED STATES PATENT OFFICE.

HENRY H. PATTEE, OF MONMOUTH, ILLINOIS.

TIME-REGISTERING APPARATUS FOR ELECTRICITY.

SPECIFICATION forming part of Letters Patent No. 478,237, dated July 5, 1892.

Application filed December 11, 1891. Serial No. 414,760. (No model.)

*To all whom it may concern:*

Be it known that I, HENRY H. PATTEE, of Monmouth, Warren county, in the State of Illinois, have invented certain new and useful Improvements in Time-Registering Apparatus for Electricity, of which the following is a specification.

My invention relates to mechanism or apparatus whereby the time during which a current of electricity is traversing a given circuit for any purpose whatever may be accurately registered and ascertained; and my invention has for its particular object the production of means whereby the current of electricity designed to operate any class of translating devices shall by its passage through the circuit momentarily operate or throw into operation suitable time-registering mechanism and instantly thereafter, having performed that function, shall automatically cut said means out of circuit.

The devices now generally employed to ascertain the consumption of the electric current are those by means of which the quantity of current which passes through a given circuit in a given time is registered or measured; but such means are not effectual, nor can they accurately record the quantity of current consumed, and for this reason are a source of considerable dissatisfaction to the consumer.

Devices similar in purpose to the object of my invention have been made and used; but they are unsatisfactory for one special reason, that when the circuit is closed to operate the translating devices the mechanism which the same current is designed to operate, so as to actuate the time-registering mechanism, is always in the circuit during the entire period that the translating devices are being used, thus interpolating into the circuit the resistance to the passage of the current that such actuating mechanism offers, causing a consumption of electricity which is charged to the consumer in excess of what is actually necessary to be employed for the purpose desired, or an unnecessary consumption and waste of electric energy. By my invention, however, the circuit which operates the time-registering mechanism remains preferably normally open, but is adapted to be closed and opened by means of a circuit closing and opening device of any suitable construction, and in the main circuit are located any desired translating devices, which for convenience I shall refer to as "electric incandescent lamps," intended to be illumined by the passage of the current when the circuit is closed by means of a suitable switch.

In order to determine how long the electric lamps or other translating devices are being used or how long the current is traversing the circuit, I arrange suitable time-registering mechanism, preferably maintained normally at rest, but adapted to be thrown into operation when the circuit is closed by means of an electro-magnet, which I interpolate in the circuit, and which in its active condition attracts an armature, by the movement of which the time-registering mechanism is actuated and instantaneously thereafter the electro-magnet is automatically cut out of circuit, the circuit being still maintained closed to the translating devices. Thus the resistance of the electro-magnet is in the circuit for only an infinitesimally small period of time, and only so long as is required to perform the function of starting or throwing into operation the time-registering mechanism. When it is desired to discontinue the use of the translating devices, the switch is again operated to open the circuit, cutting out the translating devices, but throwing into the circuit the electro-magnet, which, being energized, again attracts its armature, which by its movement operates on the time-registering mechanism to stop it and restore it to its normal condition, and instantaneously thereafter the electro-magnet is automatically cut out of circuit, all the parts are at rest and the consumption of current ceases. Of course the operation above described may be reversed—that is to say, the time-registering mechanism may be designed to run when the circuit is open and the translating devices not in use but adapted to be stopped when the circuit is closed by the movement of an armature caused by the momentary energization of its electro-magnet, and adapted to be set in motion again when the current is turned off. In either case the time during which the current is used will be ascertained by suitable registering or recording devices.

The foregoing describes generally the objects of my invention, which are particularly set forth in the claims hereinafter following, and in the accompanying drawings, forming a part hereof, I have illustrated one form of mechanism which embodies my invention and two methods substantially the same, of running the electric circuit in which it is to be located.

In said drawings, Figure 1 is a front view in elevation of a case adapted to hold a mechanism embodying my invention, with the door open and partly broken away, exposing the parts to view in their relative positions and showing a dial-plate which forms part of the time-registering apparatus. Fig. 2 is a front view in elevation similar to Fig 1, with the dial-plate removed, showing the parts that are located behind the dial-plate comprising the time-registering apparatus. Fig. 3 is a sectional side view in elevation of the mechanism shown in Figs. 1 and 2, taken through line $x$ $x$ of Fig. 1. Fig. 4 is a front view in elevation of the electro-magnet and the parts directly acted upon by the movement of the armature. Fig. 5 is a top view taken through line $x$ $x$ of Fig. 4. Fig. 6 is a sectional view taken through line $y$ $y$ of Fig. 5, looking in the direction of the arrows in said figure. Fig. 7 is a diagrammatical view showing the electric circuit from the main operating-switch and the shunt-circuit, in which is located the electro-magnet and in which the rear side of the electro-magnet is exposed to view through a portion of the back of the case broken away; and Fig. 8 is a diagrammatical view similar to Fig. 7, showing another method of running the electric circuit.

A is a case of wood or other suitable material provided with a door B, having an opening $b$, in which is secured a circular piece of glass $b'$, through which when the door is closed readings may be taken from a graduated and figured dial-plate located immediately behind. Within this case, preferably arranged and located as shown in Figs. 1 and 2, is one form of mechanism which embodies my invention—that is to say, in the bottom of the case is placed one or more electro-magnets C, securely fastened to the support or bed-plate $c$, which is secured to the bottom of case A by screws $c'$ as shown in Fig. 1. As will also be seen in that figure, the bed-plate $c$ is hollowed out on its under side to accommodate the armature D, which is located within it. On the top of the electro-magnet is secured the usual back armature or cross-bar E, to which is secured by the screws $e$ $e'$ a metal box or case F, as shown in Figs. 1 and 2. A block of insulation G is secured to the rear side of the back armature E, from which block rise the binding-posts H H'. To this block of insulation G are secured two strips of metal $g$ $g'$, which comprise the terminals of the electric circuit designed to be closed by a spring-switch I, as will be hereinafter explained. The strips $g$ $g'$ are bent, as shown in Fig. 4, so that one side rests on the top of the block of insulation G and is secured thereto by the binding-posts H H', and the other side of said strips hang down and rest against the sides of the block of insulation.

To the armature D is connected a vertical rod J, which passes between the helices of the magnet up through the binding-plate E and out through the case F, and near the upper end of the rod J is an opening which is mortised out and in which is pivoted a pawl $a$, which has a lateral movement on the pivot $a'$. From the under side of the support $c$ are secured downwardly-extending guide-rods $d$ $d'$, which guide the armature in its movement upward when attracted by the electro-magnet.

L L' are two rods, preferably formed in two parts, united by couplings $l$ $l'$, threaded on their inner sides to mesh with the threaded ends of the parts of the rods L L', so as to unite the threaded ends together, and are held in place by jam-nuts $l^2$ and $l^3$, and by means of these couplings and the construction of the rods in two parts the length of the rods may be properly and conveniently adjusted. The extreme lower ends of the rods fit into bearings or openings in the binding-plate E, and they pass vertically through openings in the top of the case F. Near the lower ends of the rods L L' are secured thereto heads K K', constructed as shown in the drawings, (see Figs. 1 and 2,) being cut out on their inner faces, so as to provide lugs $f$ $f'$, the purpose of which will be presently explained. These heads are located within the case F, and, with the rods L L', are free to move up and down therethrough to the extent of the predetermined desired movement for which they have been adjusted, their movement upward being prevented beyond the desired extent by the upper shoulder of the lug $f$ or $f'$, which is broader than the openings through the case F, thereby preventing the heads from coming out thereof. Through these heads pass studs or pins $m$ $m'$, which engage with the ends of a cross bar or lever M, which is midway secured to the spindle $n$, which passes through or is journaled in the block of insulation G, and to the outer end of the spindle $n$ is secured a spring-piece of metal constituting the electric switch I, which is rigidly attached to said spindle by means of the nut $i$ and bolt $i'$, which passes through the spindle, as will be readily understood, and when the lever M on the spindle or shaft $n$ turns the switch I will also turn, both being rigidly secured on the same shaft $n$. The lower end of the switch I is always in contact with one end of the magnet-wire through a metal piece or electrode P, also secured to the block of insulation G, and the upper end of said switch is adapted to move or sweep between the two terminals or electrodes $g$ $g'$, before described, and thereby closing the circuit through either in the manner hereinafter set forth.

The time-registering mechanism which I preferably employ for ascertaining the number of hours or the period of time during which the translating devices have been employed—such as incandescent electric lamps, as shown—is illustrated in the drawings, of which the following is a description: In the upper part of the case A is placed a dial-plate S, behind which is located suitable clock-gearing or train of wheels so geared together that they will run by means of a suitable spring, which provides power for any predetermined period of time, and this period will be registered and may be ascertained by means of pointers R R' R² and small dials s s' s² on the dial-plate S, said dials being graduated and figured, as shown. In Fig. 3 is shown a spring T, which when wound gives motion to the time-train in gear with the main wheel T', operated by said spring, which through suitable intermediate gear-wheels that mesh with suitable pinions will operate the pointers R R' R² and indicate on the face of the dials s s' s², as shown in the drawings, the number of hours or other unit of measurement that the time-train or clock has run—that is to say, the gear-wheel U is designed and geared to rotate once in ten hours, the gear-wheel V once in one hundred hours, and the gear-wheel W once in one thousand hours—and to the spindles which these gear-wheels rotate are connected the pointers R R' R², which indicate on the face of the dials s s' s², as shown, the period of time in hours, tens of hours, and hundreds of hours that the clock has run, such shafts or spindles being suitably journaled in the supporting-frame, as usual, and the dials being graded or marked circularly into ten regular intervals. The position of the pointers will indicate at all times the number of hours that the clock has been running, and readings may be taken from these dials in the usual manner, as will be readily understood. As before stated, the time-registering mechanism is preferably normally held at rest and adapted to be set in motion by the action of the electro-magnet.

Referring to the rods L L', their upper ends are pivoted to either end of a walking-beam Q, which is secured at its center to a sleeve t, that encircles and turns on one of the pillars which bind together the frame-plates X, between which the train of clock-gearing is mounted, and to one end of this same sleeve is connected a wheel 15, having its periphery cut out or recessed, as shown in Fig. 2, with two adjoining or connecting semicircular portions or recesses N N', into which is adapted to fall and to be held therein a small trundle or roller 16, which is pivoted to one end of the lever 17, which lever is pivoted midway to the frame X. To the other end of this lever is secured a spring 18, the tension of which spring is upward, thus drawing or holding up one end of the lever 17 and holding down the other end of the lever, pressing the trundle 16 into one or the other of the recesses N or N' in the wheel 15, securely locking and holding the sleeve in proper position when turned in either direction. On the sleeve t is rigidly connected or sleeved an arm 19, which has secured to it at its upper end a flat spring 20. One end of this spring is adapted to press against the rim of the balance-wheel 21 of the clock mechanism, and thereby prevent it from revolving or oscillating in its partial rotation, and thus holding the mechanism at rest, and the position of the parts when at rest is shown in Fig. 2, with the spring 20 engaging with or resting against the balance-wheel.

In Fig. 7 I have illustrated one system of running the electric circuit, comprising main wires 1, 2, and 7, in which I have inserted three translating devices, electric incandescent lamps O O' O², and in the main-line circuit I place a three-way or "two-point" switch 3, which turns on the pivot 5 to points 4 and 6. In that figure the circuit from the generator Z is broken and the translating devices are not in use, because tracing the circuit from the generator Z by wire 7 to switch 3, by wire 9 to binding-post H, to electrode g, the switch I being in contact with the other electrode g', the circuit is broken or open at that point. Moving the switch 3 from point 4 to point 6 the circuit is then closed—that is to say, from the generator Z by wire 7 to switch 3, to point 6, wire 2, through the incandescent electric lamps O O' O², to wire 1, and at the same time through wire 10 to binding-post H', electrode g', switch I, wire 12, to and through electro-magnet C, binding-post 13, wire 14, and back by wire 1 to the generator Z. When the electro-magnet has been thus energized, the armature D is attracted, thereby throwing up the rod J and moving the switch I from electrode g' to electrode g, thus breaking the circuit through the magnet, and the armature falls; but the main circuit, however, remains closed—that is to say, the circuit is complete from the generator Z, wire 7, switch 3, to point 6, wire 2, to and through the incandescent electric lamps O O' O², and by wire 1 back to the generator. When it is desired to open the circuit to the translating devices, the switch is moved back again from point 6 to point 4, and the circuit will then run from generator Z by wire 7 to switch 3, point 4, wire 9, binding-post H, electrode g, switch I, which is now in contact with said electrode, wire 12, electro-magnet C, binding-post 13, wire 14, to wire 1, back to the generator, and by the energizing of the magnet the armature has been again attracted, throwing up the rod J, as before, moving the switch I from electrode g to electrode g' and breaking the circuit through the magnet the armature falls and all the parts are at rest, and the circuit from the generator is now entirely open.

The manner of starting the time-registering mechanism and its operation is as follows: When the circuit to the translating devices is closed by means of the switch 3, as before explained, the electro-magnet is energized and the armature is attracted or drawn up, at the same time forcing up rod J, causing the pawl a, connected therewith, to strike up against the lug f' on the head K', lifting it up, throwing up the rod L', working the walking-beam Q, which will throw down the other rod L, and thereby at the same time rotate the sleeve t, turn wheel 15, and throw out the trundle 16 from one or the other of the recesses N N' in the wheel 15, the trundle thereby dropping into the adjoining recess, into which it is held by the lever 17, and the spring 18, connected therewith, as before explained. The working of the walking-beam Q turns the sleeve t, which thereby throws back the arm 19, withdrawing the flat spring 20 away from the balance-wheel 21, and in so doing wipes the balance-wheel, giving it a slight initial impetus sufficient to start it on its motion and the time mechanism commences to run. By the movement of the rod J the cross-bar or lever M has been moved by the pin m', which passes through the head K', striking one end of said lever M, and the switch I, being on the same shaft with the cross-bar M, has also been moved from the electrode g' to the electrode g, automatically breaking the circuit through the electro-magnet and the armature and rod J fall, and by the falling of the rod J the pawl a, connected therewith, will strike against the lower inside inclined face of the head K', which is now in its raised position, and thereby be thrown to the other side of the rod into position ready to engage with the lug f on the head K, so as to raise the head K and rod L, connected with it, when the circuit is again closed to the electro-magnet, and the armature thereby again raised. The position of the parts when the translating devices are being used and the time mechanism running is shown in Fig. 1—that is to say, the arm 19 is thrown back and the spring 20 is away from or out of engagement with the balance-wheel, the rod L' is up and the rod L down, the pawl a on the rod J is in position under the lug f of the head K, and one end of the switch I is in contact with the electrode g; and in Fig. 4 is shown the position of the arm M and switch I when all circuits are open and the whole apparatus at rest. Moving again the switch 3, as before explained, the circuit is opened to the translating devices and closed to the electro-magnet, which attracts the armature D, moving the rod J, and the pawl a engages the lug f on the head K, lifting it and the rod up, turning the sleeve t and permitting the trundle 16 on the lever 17 to fall into the other recess into which it is held by the spring 18, and at the same time the arm 19, connected with the sleeve t, is thrown over and the flat spring 20 strikes the balance-wheel 21 and stops it, thereby stopping the clock mechanism. As before stated, the electro-magnet is in circuit only so long as is required to start or stop the time-registering mechanism, which functions, by the devices shown and described and which I preferably employ, are performed in an infinitesimally short period of time, and notwithstanding that the electro-magnet is instantly automatically cut out of circuit the main circuit to the translating devices remains closed until the main operating-switch is again moved to cut out the translating devices; but by this movement the circuit to the electro-magnet is again closed and the electro-magnet is in circuit again only so long as is required to perform the function of stopping the time-registering mechanism when it is automatically cut out of circuit.

In Fig. 8 I have illustrated another mode of installing or connecting up my invention, which in some respects is preferable to that just hereinbefore described, in which it will be observed that wire 9 is connected to binding-post H and to wire 7 between switch 22, which may be an ordinary two-way or "one-point" switch, and generator Z. Wire 10 is connected to binding-post H' and wire 1, and wire 14 is connected to binding-post 13 and wire 2. When switch 22 is open and switch I in contact with electrode g', the circuits from the generator through the translating devices and electro-magnet are both cut or broken at point 23. Consequently no current will flow and the translating devices and electro-magnet will be unaffected so long as switch 22 remains open. When switch 22 is moved onto point 23, a circuit will be formed through wire 7, switch 22, point 23, wire 2, lamps O O' O², and back by wire 1 to generator Z. At the same time a circuit is also formed through wires 2 and 14, electro-magnet C, switch I, (now in contact with electrode g',) wire 10, and wire 1, back to generator Z. At this juncture the electro-magnet will be energized and the switch I shunted onto electrode g precisely in the same manner as hereinbefore explained, thus instantaneously cutting the electro-magnet out of circuit while the main circuit to the translating devices remains intact. If with the switches thus placed on points 23 and g the circuit is traced from the generator Z, through wire 7, point 23, wires 2 and 14, binding-post 13, electro-magnet C, switch I, electrode g, and wire 9, we return to wire 7, which, being now of the same polarity as wire 9, the current is neutralized; or, in other words, no current will flow nor will any action be had upon the electro-magnet. Again, commencing at the generator and tracing wire 9 through contact g, switch I, electro-magnet C, wire 14, translating devices O O' O², wire 1 to generator Z, the electro-magnet and translating devices are found to be in a series circuit, but as the resistance of the electro-magnet is much higher than that of the translating devices no current will flow through this source, but so soon as switch 22 is thrown off from point 23, when it is desired to stop the operation of the translating devices, the current will then flow through wire 9, electrode g, switch I, electro-magnet C, wire 14, translating devices O O' O², wire 1, back to generator Z, forming a completed circuit through the electro-magnet and translating devices in series with each other, thereby causing the electro-magnet to be again energized, which by its operation as hereinbefore described the switch I will be shunted back onto electrode $g'$ and the whole apparatus thereby placed at rest, in which condition it will remain until the switch 22 is again operated to actuate the translating devices.

My invention may be utilized, no matter how many translating devices there may be in any given circuit, and the charge to the consumer ascertained according to the number of hours or other unit of time-measurement that the current from the source of electricity has been supplied and the number of translating devices employed, although, of course, a separate mechanism embodying my invention may be arranged in circuit to each separate translating device, if desired.

As will be understood, the pointers R R' R² have been rotating with their spindles during the period of time that the circuit has been closed to the translating devices, and thereby recording in units, tens, and hundreds hours the length of time that the current is being used. Thus I provide a simple and efficient means for accurately computing and determining the value of the current that has been furnished over a given circuit for any given purpose by ascertaining exactly the period of time during which the current has traversed the circuit in any predetermined units of measurement. The time-registering mechanism being in motion preferably during the time the circuit is in use, the pointers on the dial-plate will denote or record at any time the aggregate period of time during which the current has been furnished, the pointers having been originally set or turned back to the zero-point.

While I have shown and described a time-registering mechanism having as its pulsative device a balance-wheel, yet my invention may be applied to a time-registering mechanism of any desired construction having any of the usual escapement devices, to which may be given an initial impetus by the action of an electro-magnet to start the mechanism and a corresponding action of the electro-magnet to stop the mechanism—that is, the electro-magnet controls the time-registering mechanism—and while the mechanism before described and shown in the drawings embodies my invention and effectually accomplishes my desired objects yet I do not limit my invention to the precise parts in number, size, or construction, nor to the relative arrangement shown and described; but What I do claim as my invention is set forth in the following claims, viz:

1. The combination, with a main circuit from a source of electricity, of one or more translating devices arranged therein, a switch to control said circuit, an electro-magnet arranged in a shunt-circuit from the main circuit, a switch to control the shunt-circuit adapted to be operated by the electro-magnet, and time-registering mechanism adapted to be stopped or started by said electro-magnet.

2. The combination, with a source of electricity, of one or more translating devices arranged in a circuit therefrom, an electro-magnet, also arranged in said circuit, a switch to control the circuit, time-registering mechanism, and means operated by said electro-magnet to automatically stop or start said time-registering mechanism, and means, also operated by the electro-magnet, to automatically cut the electro-magnet out of circuit.

3. The combination, with a source of electricity, of one or more translating devices arranged in a circuit therefrom, an electro-magnet also arranged in said circuit, a switch to control the circuit, and a separate switch adapted to be operated by the electro-magnet to cut the electro-magnet out of circuit.

4. The combination, with a source of electricity, of one or more translating devices arranged in a circuit therefrom, an electro-magnet also arranged in said circuit, a switch to control the circuit, time-registering mechanism adapted to be started or stopped by said electro-magnet, and a separate switch adapted to be operated by the electro-magnet to cut the electro-magnet out of circuit.

5. The combination, with a source of electricity, of one or more translating devices arranged in a circuit therefrom, an electro-magnet also arranged in said circuit, a switch to control the circuit, time-registering mechanism adapted to be stopped and started by said electro-magnet, and means operated by said electro-magnet to automatically cut said electro-magnet out of circuit.

6. The combination, with a source of electricity, of one or more translating devices arranged in a circuit therefrom, an electro-magnet also arranged in said circuit, an armature adapted to be actuated by the electro-magnet, a switch to control the circuit, time-registering mechanism adapted to be stopped or started by the movement of said armature, and means operated by said armature to automatically cut the electro-magnet out of circuit.

7. The combination, with a source of electricity, of one or more translating devices arranged in a circuit therefrom, a switch to control said circuit, an electro-magnet also arranged in said circuit, an armature adapted to be actuated by said electro-magnet, time-registering mechanism, and means adapted to be operated by said armature to start or stop said time-registering mechanism and at the same time cut the electro-magnet out of circuit.

8. The combination, with a main circuit from a source of electricity, of one or more translating devices arranged therein, a switch to control the main circuit, an electro-magnet arranged in a shunt-circuit from the main circuit, time-registering mechanism adapted to be started or stopped by said electro-magnet, and means also operated by said electro-magnet to automatically cut the electro-magnet out of circuit.

9. The combination, with a source of electricity, of one or more translated devices arranged in a circuit therefrom, a switch to control said circuit, an electro-magnet also arranged in said circuit, an armature adapted to be actuated by said electro-magnet, time-registering mechanism, means adapted to be operated by said armature to start or stop said time-registering mechanism, and a switch also adapted to be operated by the movement of said armature to automatically cut the electro-magnet out of circuit.

10. The combination, with a source of electricity, of one or more translating devices arranged in a circuit therefrom, a switch to control said circuit, time-registering mechanism adapted to be started or stopped by said electro-magnet, an armature adapted to be actuated by said magnet, and a switch adapted to be operated by the movement of the armature to automatically cut the electro-magnet out of circuit.

11. The combination, with an electro-magnet and its armature, of the rod J, connected therewith, pawl $a$, connected with said rod, rods L L' and heads K K', connected with said rods, walking-beam Q, to which the rods L L' are attached, and sleeve $t$, all arranged and adapted to be operated by the movement of said armature when the electro-magnet is energized, substantially as set forth.

12. The combination, with an electro-magnet and its armature, of the rod J, connected therewith, pawl $a$, connected with said rod, rods L L', couplings $l\,l'$, heads K K', connected with said rods, walking-beam Q, and sleeve $t$, all arranged and adapted to be operated by the movement of said armature when the electro-magnet is energized, substantially as set forth.

13. The combination, with an electro-magnet and its armature, of the rod J, connected therewith, pawl $a$, rods L L', connected with the walking-beam Q, sleeve $t$, heads K K', connected with said rods, and pins $m\,m'$, which pass through said heads K K', lever M on the shaft $n$, and switch I, all arranged and adapted to be operated by the movement of said armature when said electro-magnet is energized, substantially as set forth.

14. The combination, with a source of electricity, of a switch to control the circuit leading therefrom, an electro-magnet in said circuit, an armature adapted to be operated by said electro-magnet, a rod J, connected with said armature, a pawl $a$, connected with said rod, rods L L', connected to the walking-beam Q, which turns the sleeve $t$, heads K K', connected with said rods L L', pins $m\,m'$, which pass through said heads K K', a lever M adapted to be moved by said pins, a switch I on the same shaft with the lever M, an electrode P, with which said switch I makes contact, and electrodes $g\,g'$, all arranged and adapted to be operated by the movement of said armature when the electro-magnet is energized, substantially as set forth.

15. The combination, with a time-registering mechanism, of means to start or stop said mechanism, consisting of the arm 19 on the sleeve $t$, a spring 20, connected with said arm, lever 17, having the spring 18 attached at one end and the trundle 16 pivoted to the other end, wheel 15 on said sleeve $t$, provided with recesses N N' in its periphery, into which the trundle 16 is adapted to fall and to be held therein by the spring 18, and walking-beam Q on the sleeve $t$, said mechanism adapted to be actuated by an electro-magnet, substantially as set forth.

16. The combination, with a time-registering mechanism having as its pulsative device a balance-wheel, of means to start or stop said mechanism, consisting of the arm 19 on the sleeve $t$, a spring 20, connected with said arm, lever 17, having the spring 18 connected at one end and the trundle 16 pivoted to the other end, wheel 15 on said sleeve $t$, provided with recesses N N' in its periphery, into which the trundle 16 is adapted to fall and to be held therein by the spring 18, and walking-beam Q on the sleeve $t$, said mechanism being adapted to be started or stopped by an electro-magnet, substantially as set forth.

17. The combination, with a time-registering mechanism, of a graduated dial-plate, pointers in gear with said time-registering mechanism, an escapement device forming part of said time-registering mechanism, and means adapted to start or stop the said time-registering mechanism, consisting of an arm 19 on the sleeve $t$, spring 20, connected with said arm, adapted to engage with said escapement device, walking-beam Q, also connected with the sleeve $t$, and rods L L', connected with the said walking-beam, said rods being adapted to be moved up or down to start or stop the time-registering mechanism by the action of an electro-magnet, substantially as set forth.

18. The combination, with a time-registering mechanism, of an escapement device forming part thereof and means adapted to start or stop said time-registering mechanism, consisting of an arm adapted to engage with said escapement device, a walking-beam connected with said arm, and means to move said walking-beam adapted to be operated by an electro-magnet, substantially as and for the purpose set forth.

19. The combination, with a source of electricity, of one or more translating devices arranged in a circuit therefrom, an electro-magnet also arranged in said circuit, a switch to control the circuit, time-registering mechanism, and an escapement device forming part thereof, and means adapted to start or stop said time-registering mechanism, consisting of an arm adapted to engage with said escapement device, a walking-beam connected with said arm, and means to move said walking-beam adapted to be operated by said electro-magnet, substantially as and for the purpose set forth.

This specification signed and witnessed this 2d day of December, 1891.

HENRY H. PATTEE.

In presence of—
 F. H. SMITH,
 W. C. ARTHUR.